(12) United States Patent
Campbell

(10) Patent No.: US 12,313,604 B2
(45) Date of Patent: May 27, 2025

(54) TESTING ARRANGEMENT AND METHOD FOR COMPOSITE WITH NOODLE

(71) Applicant: RAYTHEON TECHNOLOGIES CORPORATION, Farmington, CT (US)

(72) Inventor: Christian X. Campbell, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 324 days.

(21) Appl. No.: 18/099,634

(22) Filed: Jan. 20, 2023

(65) Prior Publication Data

US 2024/0248019 A1 Jul. 25, 2024

(51) Int. Cl.
  *G01N 3/20* (2006.01)
  *G01N 3/08* (2006.01)
  *G01N 3/14* (2006.01)

(52) U.S. Cl.
  CPC .............. *G01N 3/20* (2013.01); *G01N 3/14* (2013.01); *G01N 2203/0017* (2013.01); *G01N 2203/0019* (2013.01); *G01N 2203/0023* (2013.01); *G01N 2203/0033* (2013.01); *G01N 2203/025* (2013.01); *G01N 2203/0262* (2013.01); *G01N 2203/04* (2013.01)

(58) Field of Classification Search
  CPC ... G01N 2203/0019; G01N 2203/0023; G01N 2203/0033; G01N 3/20; G01N 3/14; G01N 2203/0017; G01N 2203/025; G01N 2203/0262; G01N 2203/04

USPC ........................................... 73/849, 851, 848
See application file for complete search history.

(56) References Cited

U.S. PATENT DOCUMENTS

| 4,986,132 A * | 1/1991 | Calomino ................. G01N 3/20 73/852 |
| 7,464,606 B2 * | 12/2008 | Wong ........................ G01N 3/34 73/849 |
| 2020/0173881 A1 | 6/2020 | Schaefer et al. |
| 2020/0175127 A1 | 6/2020 | Schaefer et al. |
| 2020/0175132 A1 | 6/2020 | Schaefer et al. |

FOREIGN PATENT DOCUMENTS

GB 2324876 A * 11/1998 ............... G01N 3/32

* cited by examiner

*Primary Examiner* — Brandi N Hopkins
(74) *Attorney, Agent, or Firm* — Carlson, Gaskey & Olds, P.C.

(57) ABSTRACT

A testing arrangement includes a test specimen that is formed of a fiber composite that has first, second, and third groups of fiber ply layers. Each fiber ply layer is curved so as to have an elbow. The elbows are joined back-to-back at a central region to form first, second, and third arms that extend outwardly from the central region. The elbows define a space in the central region, and there is a space-filler within the space. The test specimen is mounted in a testing fixture such that the first and second arms are in four-point bend loading and the third arm is oriented vertically. The testing fixture is actuatable to apply an actuated load. There is an applied load on the third arm. The applied load and the actuated load cause stress in the space-filler for evaluating mechanical behavior of the space-filler.

16 Claims, 2 Drawing Sheets

TESTING ARRANGEMENT AND METHOD FOR COMPOSITE WITH NOODLE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils, including understanding the mechanical behavior of CMC systems.

SUMMARY

A testing arrangement according to an example of the present disclosure includes a test specimen formed of a fiber composite having first, second, and third groups of fiber ply layers. Each of the first, second, and third groups of fiber ply layers are curved so as to have an elbow. The elbows are joined back-to-back at a central region so as to form first, second, and third arms that extend outwardly from the central region within respective mutually exclusive 120° sectors about the central region. The elbows define a space in the central region, and there is a space-filler within the space. A testing fixture in which the test specimen is mounted such that the first and second arms are in four-point bend loading and the third arm is oriented vertically is actuatable to apply an actuated load on the first and second arms. An applied load on the third arm and the actuated load causes stress in the space-filler for evaluating mechanical behavior of the space-filler.

In a further embodiment of any of the foregoing embodiments, the first group of fiber ply layers is exclusive to first and second arms of the three arms, the second group of fiber ply layers is exclusive to second and third arms of the three arms, and the third group of fiber ply layers is exclusive to third and first arms of the three arms.

In a further embodiment of any of the foregoing embodiments, the first and second arms form an included angle of approximately 120°, the second and third arms form an included angle of approximately 120°, and the third and first arms form an included angle of approximately 120°.

In a further embodiment of any of the foregoing embodiments, the fiber composite is a ceramic matrix composite.

In a further embodiment of any of the foregoing embodiments, the ceramic matrix composite is a SiC fiber/SiC matrix composite.

In a further embodiment of any of the foregoing embodiments, the space-filler is a ceramic matrix composite.

In a further embodiment of any of the foregoing embodiments, each of the first, second, and third groups of fiber ply layers has at least three ply layers.

In a further embodiment of any of the foregoing embodiments, the applied load is a dead load.

A method of testing according to an example of the present disclosure includes mounting a test specimen in a testing fixture. The test specimen is formed of a fiber composite that has first, second, and third groups of fiber ply layers. Each of the first, second, and third groups of fiber ply layers is curved so as to have an elbow. The elbows are joined back-to-back at a central region so as to form first, second, and third arms that extend outwardly from the central region in respective mutually exclusive 120° sectors about the central region. The elbows define a space in the central region, and there is a space-filler is within the space. The test specimen is mounted such that the first and second arms are in four-point bend loading and the third arm is oriented vertically. The testing fixture is actuatable to apply an actuated load, and provides an applied load on the third arm. The applied load and the actuated load causing stress in the space-filler for evaluating mechanical behavior of the space-filler.

In a further embodiment of any of the foregoing embodiments, the first group of fiber ply layers is exclusive to first and second arms of the three arms, the second group of fiber ply layers is exclusive to second and third arms of the three arms, and the third group of fiber ply layers is exclusive to third and first arms of the three arms.

In a further embodiment of any of the foregoing embodiments, the first and second arms form an included angle of approximately 120°, the second and third arms form an included angle of approximately 120°, and the third and first arms form an included angle of approximately 120°.

In a further embodiment of any of the foregoing embodiments, the fiber composite is a ceramic matrix composite.

In a further embodiment of any of the foregoing embodiments, the ceramic matrix composite is a SiC fiber/SiC matrix composite.

In a further embodiment of any of the foregoing embodiments, the space-filler is a ceramic matrix composite.

In a further embodiment of any of the foregoing embodiments, each of the first, second, and third groups of fiber ply layers has at least three ply layers.

In a further embodiment of any of the foregoing embodiments, the applied load is a dead load.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Ceramic matrix composite (CMC) materials are being considered for airfoils and other gas turbine engine components. Although somewhat pliable, the fiber plies of the CMC (before consolidation with the matrix material) are unable to sharply bend at a corner. Therefore, at locations where fiber plies of the CMC bend to meet, such as in a trailing end of an airfoil, there is a space left between the plies. In order to reduce collapse of the plies into the space and facilitate lay-up of the plies into a desired geometry during processing, a space-filler is included in the space. For example, a fibrous space-filler is sometimes referred to as a "noodle" because it may be formed from a bundle of fiber tows, which resemble spaghetti noodles. The tows may be unidirectionally arranged along the length of the space that they fill but may alternatively be chopped fibers that are randomly oriented. There are also monolithic space-fillers that are formed of a monolithic porous ceramic. Although space-fillers are typically not structural, they do play a role in the mechanical toughening behavior of the CMC as a system. A challenge, however, is that mechanical loading of T-shaped CMC test specimens that have space-fillers results in high interlaminar stresses applied between plies of the CMC and comparatively low stress or no stress applied to the space-filler. Consequently, interfacial cracking occurs before there is meaningful loading of the space-filler to enable evaluation of its mechanical behavior in the CMC system. As will be described below, the disclosed testing arrangement and methodology extends evaluation capability by facilitating the application of stress to a space-filler in a CMC system.

Figure 1A:
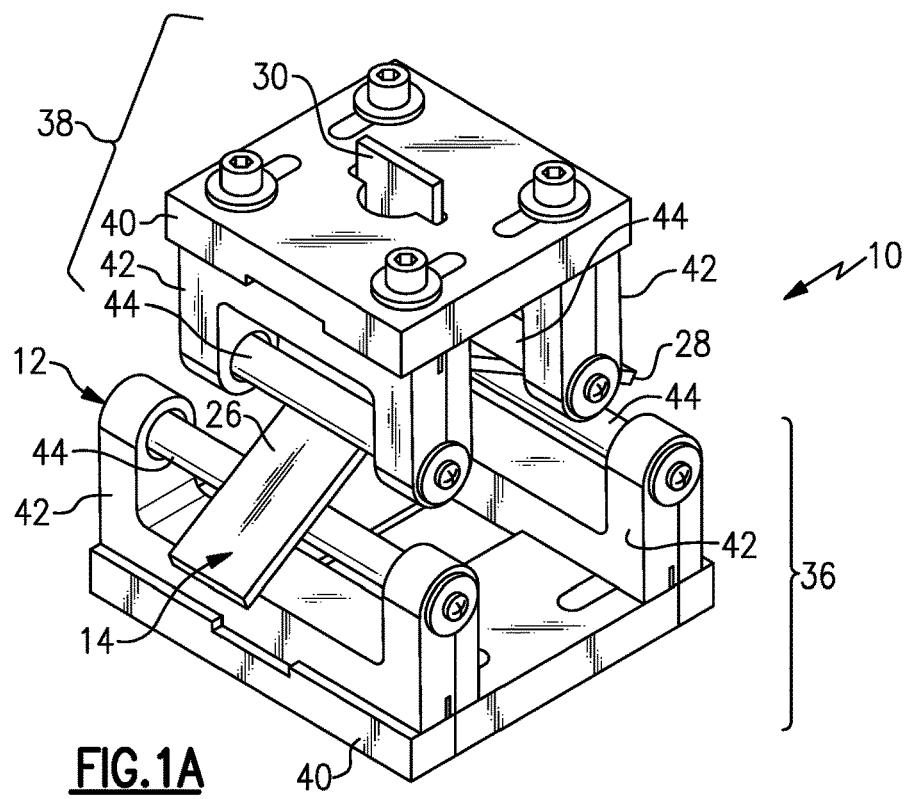
FIG. 1A illustrates an example of a testing system.
Figure 1B:
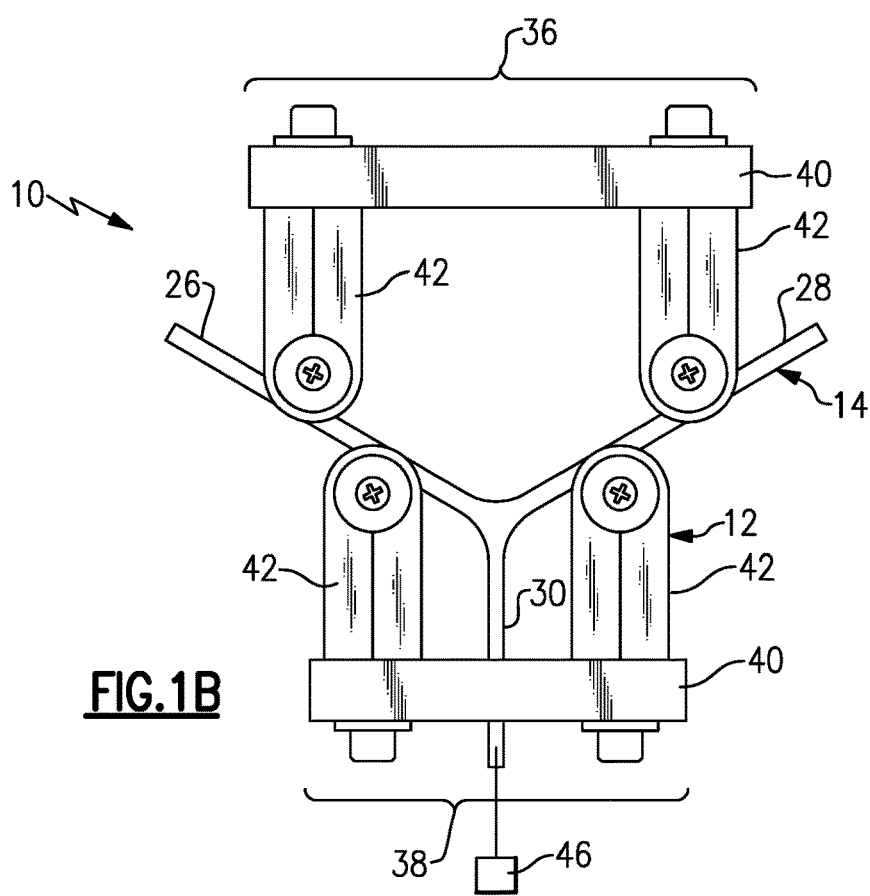
FIG. 1B illustrates a view from a side of the testing system.
Figure 2:
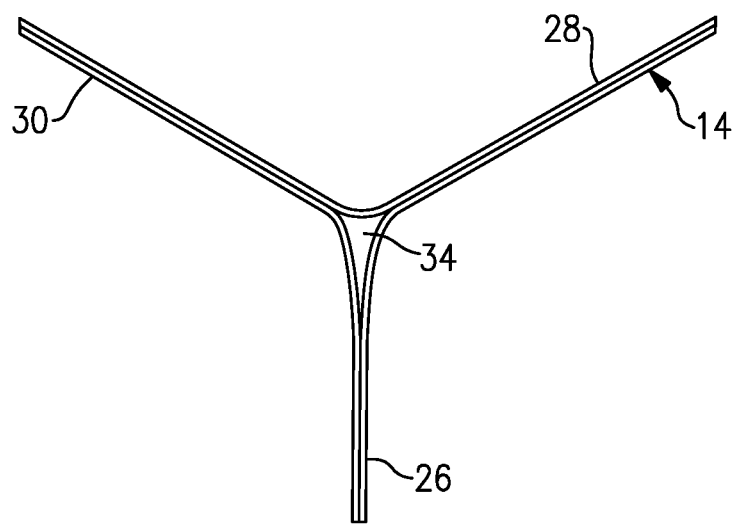
FIG. 2 shows an isolated view of a test specimen.
Figure 3:
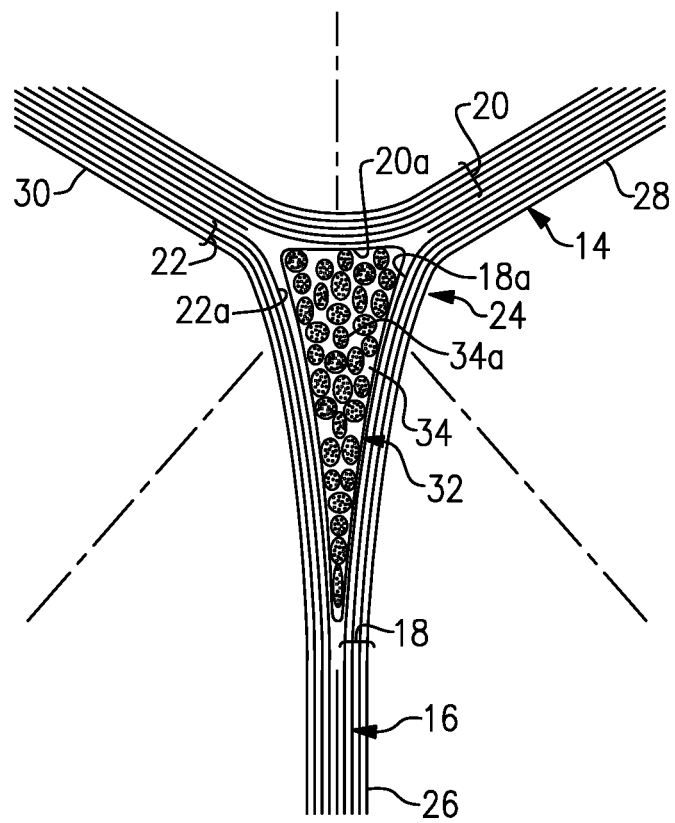
FIG. 3 shows the fiber ply configuration of the test specimen.

FIG. 1A is an isometric view of an example of a testing arrangement 10, and FIG. 1B shows a view of the testing arrangement 10 from one side. The testing arrangement 10 includes a testing fixture 12 for holding a test specimen 14. The test specimen 14 is shown in an isolated view in FIG. 2, while FIG. 3 shows the composite fiber ply layup of the test specimen 14.

The test specimen 14 is formed of a fiber composite 16. For example, the fiber composite 16 is a CMC. A CMC material is comprised of ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. Although the fiber composite 16 is a CMC in this example, it is to be appreciated that this disclosure may also benefit other types of fiber composites, such as organic matrix composites.

The fiber composite 16 has three groups of fiber ply layers that are shown, respectively, at 18, 20, and 22. As shown, each group of fiber ply layers 18, 20, and 22 has three layers, although two layers or more than three layers could also be used. Each group of fiber ply layers 18, 20, and 22 is curved so as to have an elbow 18a, 20a, and 22a. The elbows 18a, 20a, and 22a are joined back-to-back at a central region 24 so as to form first, second, and third arms 26, 28, and 30 that extend outwardly from the central region 24 within respective mutually exclusive 120° sectors about the central region 24. The first group of fiber ply layers 18 is exclusive to the first and second arms 26 and 28, the second group of fiber ply layers 20 is exclusive to second and third arms 28 and 30, and the third group of fiber ply layers 22 is exclusive to third and first arms 30 and 26. Put another way, the first group of fiber ply layers 18 is stacked with the second group of fiber ply layers 20 to form the second arm 28, the second group of fiber ply layers 20 is stacked with the third group of fiber ply layers 22 to form the third arm 30, and the first group of fiber ply layers 18 is stacked with the third group of fiber ply layers 22 to form the first arm 26. Additional fiber ply layers may be interleaved between the groups in each arm to adjust arm thickness. The term "back-to-back" refers to each group of fiber ply layers 18, 20, and 22 being oriented such that the concavity of the curvature opens outwardly, away from the central region 24.

The elbows define a space 32 in the central region 24. In this example, there is a fibrous space-filler 34 (e.g., a noodle) within the space 32, but other types of space-fillers may alternatively be used. The fibrous space-filler 34 is also a CMC, but rather than fiber plies it has fiber tows 34a. The tows 34a are of the same type as in the CMC of the fiber ply layers 18, 20, and 22 (e.g., SiC), and the matrix material of the space-filler 34 is the same as the matrix material of the CMC of the fiber ply layers 18, 20, and 22 (e.g. SiC).

The sectors are denoted and bound by the dashed lines in FIG. 3 and are used here for the purpose of denoting that the triad of arms 26, 28, and 30 extend three different directions, i.e., the tips of the arms are at points of a triangle. In the illustrated example, the arms 26, 28, and 30 extend from the central region 24 and are uniformly spaced such that the first and second arms 26 and 28 form an included angle of approximately 120°, the second and third arms 28 and 30 form an included angle of approximately 120°, and the third and first arms 30 and 26 form an included angle of approximately 120°. Although other angles can be used, such a uniform configuration of 120° maximizes the volume of the space 32, and thus also the fibrous space-filler 34, which facilitates the application of stress to the fibrous space-filler 34 during testing (discussed in more detail below). In general, however, each angle will be 120°+/−20°.

Referring again to FIGS. 1A and 1B, the testing fixture 12 in this example, includes a first fixture piece 36 and a second fixture piece 38. Each fixture piece 36, 38 includes a base plate 40 and a pair of spaced-apart supports 42. Each support carries an elongated load rod 44. The load rods 44 are oriented to be parallel to each other. The supports 42 on the first fixture piece 36 are spaced farther apart then the supports 42 of the second fixture piece 38. When the test specimen is mounted in the testing fixture 14, the load rods 44 of the first fixture piece 36 contact the top surfaces of the arms 26 and 28, while the load rods 44 of the second fixture piece 38 contact the lower surfaces of the arms 26 and 28 "inside" of the locations where the load rods 44 contact the top surfaces (i.e., closer to the central region 24). The load rods 44 thus provide a four point support for loading the test specimen 14 with a four-point bending load. The third arm 30 of the test specimen 14 is oriented vertically and extends through a through hole in the base plate 40 of the second fixture piece 38. The first fixture piece 36 is actuatable relative to the second fixture piece 38 to apply an actuated load on the test specimen 14. An applied load 46 is provided on the third arm 30. The applied load 46 may be a second actuated load or, as shown, a dead load. An actuated load is a load cause by movement against the test specimen and a dead load is a static, gravitational load.

An example method of testing the test specimen 14 includes mounting the test specimen 14 in the testing fixture 12. For example, the fixture pieces 36 and 38 are initially spaced apart in the vertical direction, permitting the test specimen 14 to be manually inserted between the pieces 36 and 38. The pieces 36 and 38 may then be moved toward each other such that the load rods 44 of the first fixture piece 36 contact the top surfaces of the arms 26 and 28 and the load rods 44 of the second fixture piece 38 are in contact with the lower surfaces of the arms 26 and 28. Some adjustment of the positioning of the test specimen 14 may be necessary to ensure that all of the load rods 44 contact the test specimen 14. A load rod 44 that is not in contact with the test specimen 14 provides visual indication that the test specimen 14 is not properly centered in the fixture 12.

Once mounted, the applied (dead) load 46 is then applied to the third arm 30, and the actuated load is applied by moving the first fixture piece 36 toward the second fixture piece 38. For example, the actuated load may be applied using a load cell to compress the fixture pieces 36 and 38 together. The applied load 46 and the actuated load cause stress in the test specimen 14. For example, the four point bending load and the vertical applied load 46 produce tensile and compression loads around the fibrous space-filler 34. The tensile loads are approximately equal to the compression loads such that there is a net zero load state (or at least near zero) in the fiber ply layers around the fibrous space-filler 34. Such a net zero load state reduces inter-laminar stresses between fiber ply layers. Stresses are, however, generated in the fibrous space-filler 34, which due to its maximized or enlarged size from the angles of the arms described above, is large enough to affect the mechanical behavior of the CMC system. As a result, interfacial cracking in the fiber ply layers is avoided, while the load applied to the fibrous space-filler 34 enables mechanical evaluation. For example, crack propagation can be observed and strain can be measured in the fibrous space-filler 34 in order to evaluate mechanical behavior of the space-filler 34 in the CMC system. The composition of subsequent fibrous space-fillers 34 (e.g., fiber volume, porosity, etc) can then be adjusted based on the mechanical behavior from the testing in order to tailor the properties of the space-fillers 34 to achieve a desired mechanical response in the CMC system.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A testing arrangement comprising:
   a test specimen formed of a fiber composite having first, second, and third groups of fiber ply layers, each of the first, second, and third groups of fiber ply layers being curved so as to have an elbow, the elbows being joined back-to-back at a central region so as to form first, second, and third arms that extend outwardly from the central region within respective mutually exclusive 120° sectors about the central region, the elbows defining a space in the central region, and there being a space-filler within the space;
   a testing fixture in which the test specimen is mounted such that the first and second arms are in four-point bend loading and the third arm is oriented vertically, the testing fixture being actuatable to apply an actuated load on the first and second arms; and
   an applied load on the third arm, the applied load and the actuated load causing stress in the space-filler for evaluating mechanical behavior of the space-filler.

2. The testing arrangement as recited in claim 1, wherein the first group of fiber ply layers is exclusive to first and second arms of the three arms, the second group of fiber ply layers is exclusive to second and third arms of the three arms, and the third group of fiber ply layers is exclusive to third and first arms of the three arms.

3. The testing arrangement as recited in claim 1, wherein the first and second arms form an included angle of approximately 120°, the second and third arms form an included angle of approximately 120°, and the third and first arms form an included angle of approximately 120°.

4. The testing arrangement as recited in claim 1, wherein the fiber composite is a ceramic matrix composite.

5. The testing arrangement as recited in claim 4, wherein the ceramic matrix composite is a SiC fiber/SiC matrix composite.

6. The testing arrangement as recited in claim 1, wherein the space-filler is selected from the group consisting of fibrous space-filler and a monolithic space-filler.

7. The testing arrangement as recited in claim 1, wherein each of the first, second, and third groups of fiber ply layers has at least three ply layers.

8. The testing arrangement as recited in claim 1, wherein the applied load is a dead load.

9. A method of testing comprising:
   mounting a test specimen in a testing fixture, wherein the test specimen is formed of a fiber composite that has first, second, and third groups of fiber ply layers, each of the first, second, and third groups of fiber ply layers is curved so as to have an elbow, the elbows are joined back-to-back at a central region so as to form first, second, and third arms that extend outwardly from the central region in respective mutually exclusive 120° sectors about the central region, the elbows define a space in the central region, and there is a space-filler is within the space, the test specimen is mounted such that the first and second arms are in four-point bend loading and the third arm is oriented vertically, the testing fixture is actuatable to apply an actuated load; and
   providing an applied load on the third arm, the applied load and the actuated load causing stress in the space-filler for evaluating mechanical behavior of the space-filler.

10. The method as recited in claim 9, wherein the first group of fiber ply layers is exclusive to first and second arms of the three arms, the second group of fiber ply layers is exclusive to second and third arms of the three arms, and the third group of fiber ply layers is exclusive to third and first arms of the three arms.

11. The method as recited in claim 9, wherein the first and second arms form an included angle of approximately 120°, the second and third arms form an included angle of approximately 120°, and the third and first arms form an included angle of approximately 120°.

12. The method as recited in claim 9, wherein the fiber composite is a ceramic matrix composite.

13. The method as recited in claim 12, wherein the ceramic matrix composite is a SiC fiber/SiC matrix composite.

14. The method as recited in claim 9, wherein the space-filler is a ceramic matrix composite.

15. The method as recited in claim 9, wherein each of the first, second, and third groups of fiber ply layers has at least three ply layers.

16. The method as recited in claim 9, wherein the applied load is a dead load.

\* \* \* \* \*